(12) United States Patent
Osborn et al.

(10) Patent No.: US 6,327,591 B1
(45) Date of Patent: Dec. 4, 2001

(54) ADAPTIVE DISTRIBUTED INFORMATION NETWORK

(75) Inventors: Beatrice M Osborn, London; Martin J Oates, Stowmarket; Derek J Edwards; Alan D Pengelly, both of Ipswich, all of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/117,094
(22) PCT Filed: Feb. 6, 1998
(86) PCT No.: PCT/GB98/00371
§ 371 Date: Aug. 13, 1998
§ 102(e) Date: Aug. 13, 1998
(87) PCT Pub. No.: WO98/35302
PCT Pub. Date: Aug. 13, 1998

(30) Foreign Application Priority Data

Feb. 6, 1997 (GB) .................................................. 9702458

(51) Int. Cl.⁷ .................................................... G06F 17/30
(52) U.S. Cl. ............................................................. 707/70
(58) Field of Search ........................... 709/217, 224–225, 709/226, 229, 223, 234, 219, 240; 707/70, 509, 511, 104; 703/13, 21, 22, 17, 19

(56) References Cited

U.S. PATENT DOCUMENTS

| | | | |
|---|---|---|---|
| 4,774,655 | * | 9/1988 | Kollin et al. .......................... 364/200 |
| 4,979,118 | * | 12/1990 | Kheradpir ............................. 709/241 |
| 5,459,837 | * | 10/1995 | Caccavale et al. ............. 395/184.01 |
| 5,867,824 | * | 2/1999 | Saito et al. ............................... 705/9 |
| 5,931,907 | * | 8/1999 | Davies et al. ........................ 709/218 |
| 5,937,042 | * | 8/1999 | Sofman ................................. 379/112 |
| 5,960,439 | * | 9/1999 | Hamner et al. ...................... 707/103 |
| 6,003,022 | * | 12/1999 | Eberhard et al. ......................... 707/2 |
| 6,058,260 | * | 5/2000 | Brockel et al. ................. 395/500.25 |

* cited by examiner

Primary Examiner—John Breene
Assistant Examiner—Linh Pham
(74) Attorney, Agent, or Firm—Nixon & Vanderhye P.C.

(57) ABSTRACT

An adaptive distributed network includes a plurality of information centers connected over a network. Each information center holds any number of information units. The plurality of information applications are connected over the network to the information centers. The information applications retrieve information units from and/or update units at one or more of the information centers. Information applications retrieve and/or update information units at specified information centers. The passage of information over the network is monitored and the distribution of information units across the information centers is controlled adaptively, together with knowledge of the required connectivity between information application and information units. Also the specified information centers are determined in response to the monitored passage of information to improve the system performance.

41 Claims, 10 Drawing Sheets

ADAPTIVE DISTRIBUTED INFORMATION NETWORK

BACKGROUND OF THE INVENTION

1. Field of the Invention

The present invention generally relates to a system and method for controlling an adaptive distributed information network.

2. Related Art

The management and control of a distributed information network presents significant difficulties. As more diverse distributed systems are introduced into the network the network must be managed and controlled to account for this. The usual solution is a manual reconfiguration, upgrade, or renewal. This can often mean that a user perceives poor performance or limitations for an unsatisfactory period of time before the problem can be resolved.

EP-A-0361974 discloses a method of managing a distributed database in which the load on a database server is monitored and, if this exceeds a threshold, data is transferred to another server. In this way it is claimed that the data is more uniformly distributed. This method does not however predict the outcome of relocation of the data and thus the outcome may result in an unacceptable degraded performance elsewhere in the system. This method is a trial and error method which can cause data to be moved between servers unnecessarily or a large number of times before an improvement in overall performance is achieved.

SUMMARY OF THE INVENTION

It is an object of the invention to provide a more efficient management of a distributed information network In accordance with one aspect the present invention provides an adaptive distributed information network system comprising:

a plurality of information centres connected over a network, each information centre holding any number of information units;

a plurality of information application means connected over the network to the information centres, each of said information application means being adapted to retrieve information units from and/or update information units at one or more of the information centres;

application control means for controlling the retrieval and/or updating of information units by said information application means to access specified information centres;

monitoring means for monitoring the passage of information over the network;

storage means for storing parameters modelling the distributed information network system; and system controls means for using said modelling parameters in response to said monitoring means to adaptively determine an optimum distribution of the information units across the information centres and optimum information centres for the retrieval and/or updating of information units by said information application means, and for changing the distribution of the information units across the information centres and/or updating the specified information centres using the determined optimum distribution and/or optimum information centres respectively to improve the system performance.

In accordance with a second aspect the present invention provides a network controller for controlling a network of a plurality of information centres, and a plurality of information application means for retrieving and/or updating the information units from and/or at respectively, information centres specified for each information application means, the controller comprising monitoring means for monitoring the passage of information over the network, storage means for storing parameters modelling the distributed information network system, and distribution control means for using said modelling parameters in response to said monitoring means to adaptively determine an optimum distribution of the information units across the information centres and optimum information centres for the retrieval and/or updating of information units by said information application means, and for changing the distribution of the information units across the information centres and/or determining the specified information centres using the determined optimum distribution and/or optimum information centres respectively to improve the network performance.

In accordance with a third aspect the present invention provides a method of controlling a network comprising a plurality of information centres connected over the network, each holding any number of information units, and a plurality of information application means connected over the network to the information centres, the information application means retrieving and/or updating information units from and/or to respectively specified ones of the information centres, the method comprising the steps of:

monitoring the passage of information over the network;

adaptively determining an optimum distribution of information units across the information centres and optimum information centres for the retrieval and/or updating of information units using stored parameters modelling the distributed information network system; and changing the distribution of the information units across the information centres and/or updating the specified information centres for respective information application means using the determined optimum distribution and/or optimum information centres respectively to improve the system performance.

Thus in accordance with the present invention by monitoring the passage of information of the network it is possible to determine the flow of information units between information centres and information application means. Using this information and modelling parameters which model the distribution of the information network system an optimum distribution of information units across the information centres and the optimum information centres for the information application means can be adaptively determined. In this way an optimum configuration for the distribution of data and the links between the information centres and the information application means can be determined. This configuration data can then be used to reconfigure the data base by changing the distribution of the information units across the information centres and/or changing the information centres to which queries are addressed by the information application means.

When information units for an information application means are present on more than one information centre, the performance of the system may be improved simply by redirecting the queries from the information application means to another information centre. This is appropriate when for example the information centre to which an information application means is currently directing queries is heavily loaded and another information centre holding the same information data is not heavily loaded. Clearly the performance can be improved simply by re-routing the queries from the information application means to the less heavily loaded information centre.

The system operates to update the links to the specified information centres in preference to changing the distribution of the information units since merely updating the links is a less computationally intensive and network intensive operation than moving information between information centres. However, in order to fully optimise the system, generally a mix of the redistribution of information units and the updating of the links will be required.

The distribution of information can be controlled by copying, moving and/or deleting information units at information centres. When such a redistribution of the information units has taken place, the specified information centres for respective information applications are redefined so that the information applications can access the appropriate information centres.

The adaptation to change the distribution of the information units and the specified information centres can take place either continuously during the operation of the network, at a period when network traffic is low, or at predetermined times. Alternatively, certain information units could be moved immediately whilst other information units are left until network traffic is low so that a partial adaption of the network takes place. The adaption criterion chosen will depend upon the application requirements.

The determination of the optimum configuration can be triggered to occur in response to a suitable criterion such as failure of an information centre, a network link failure or change, and when the time taken by one or more applications to retrieve and/or update information units at one or more information centres exceeds a threshold.

The performance of the network can be monitored by monitoring retrieval and/or update performance by at least one information application means. This monitored performance can be compared to a performance threshold to trigger the determination of the optimum configuration if the performance falls below the threshold.

Further, communications over the network links can be monitored and also used to control the determination of the optimum configuration.

Alternatively, in addition to monitoring the performance of the system, the performance of the system can be estimated as if it was configured using the determined optimum distribution of the information units and the determined optimum configuration centres for the optimum application means. The monitored performance can then be compared with the estimated performance and the distribution of the information units and/or the updating of the specified information centres can be controlled in dependence upon the relationship between the monitored system performance and the estimated system performance after adaption. Thus in this embodiment it can be determined whether the estimated performance is a significant improvement over the current performance before carrying out the reconfiguration of the system. This avoids unnecessary and inefficient configurations.

The control means specifies which of the information centres an application should look to for retrieval or updating of information. In one embodiment, a table specifies the information centres which contain information to be used by respective applications. Also the table can include a list of all information units contained in the information centres so that when an information unit is to be updated, it can be updated throughout the information centres in the network. Thus, when an application seeks information, the first step is to identify where the information can be found for that application.

The present invention is applicable to a distributed data base network when the information comprises data records or objects. The network can either be heterogeneous wherein at least two of the data bases are in different formats, or homogeneous where the data in the data bases is in the same format throughout the network. Where a heterogeneous network is present, when data of one type is transferred which is to be received in another format, the data must be translated between the different formats. This, could either be due to the re-distribution of the data over the data base due to adaption in which case data from one form of data base e.g. a relational data base, is translated as it is transferred to a second data base in the different format e.g. an object oriented data base. Similarly if an application requests data in one format from a data base in another format, a translation must take place.

Information units which can be moved between nodes in the network i.e. between databases can comprise different levels of data. Databases can comprise tables of individual records in a relational database format or classes of objects in an object oriented format. Thus, the information units which can be moved between databases can either be tables or classes, or one or more individual records or objects.

The present invention is also applicable to switched networks wherein the information units comprise call routing information for controlling the switching of network switches to route the calls. An example of where usage would change in such a network is where a company decides to offer a special discount on calls in an under utilised part of the communications network at a time later that day. The system could adapt itself to allow efficient access of the appropriate data for the duration of the discount in advance, and show that the system is optimised to meet the expected demand. In another example, in a mobile telephone network where a customer moves from one city to another, their data records can follow so that they are close by rather than being accessed slowly across large distances. This can take place by monitoring retrieval performance of the data for the customer and adapting the distribution of data to improve the retrieval performance.

BRIEF DESCRIPTION OF THE DRAWINGS

Embodiments of the present invention will now be described with reference to the accompanying drawings in which.

DETAILED DESCRIPTION OF EXEMPLARY EMBODIMENTS

Figure 1:
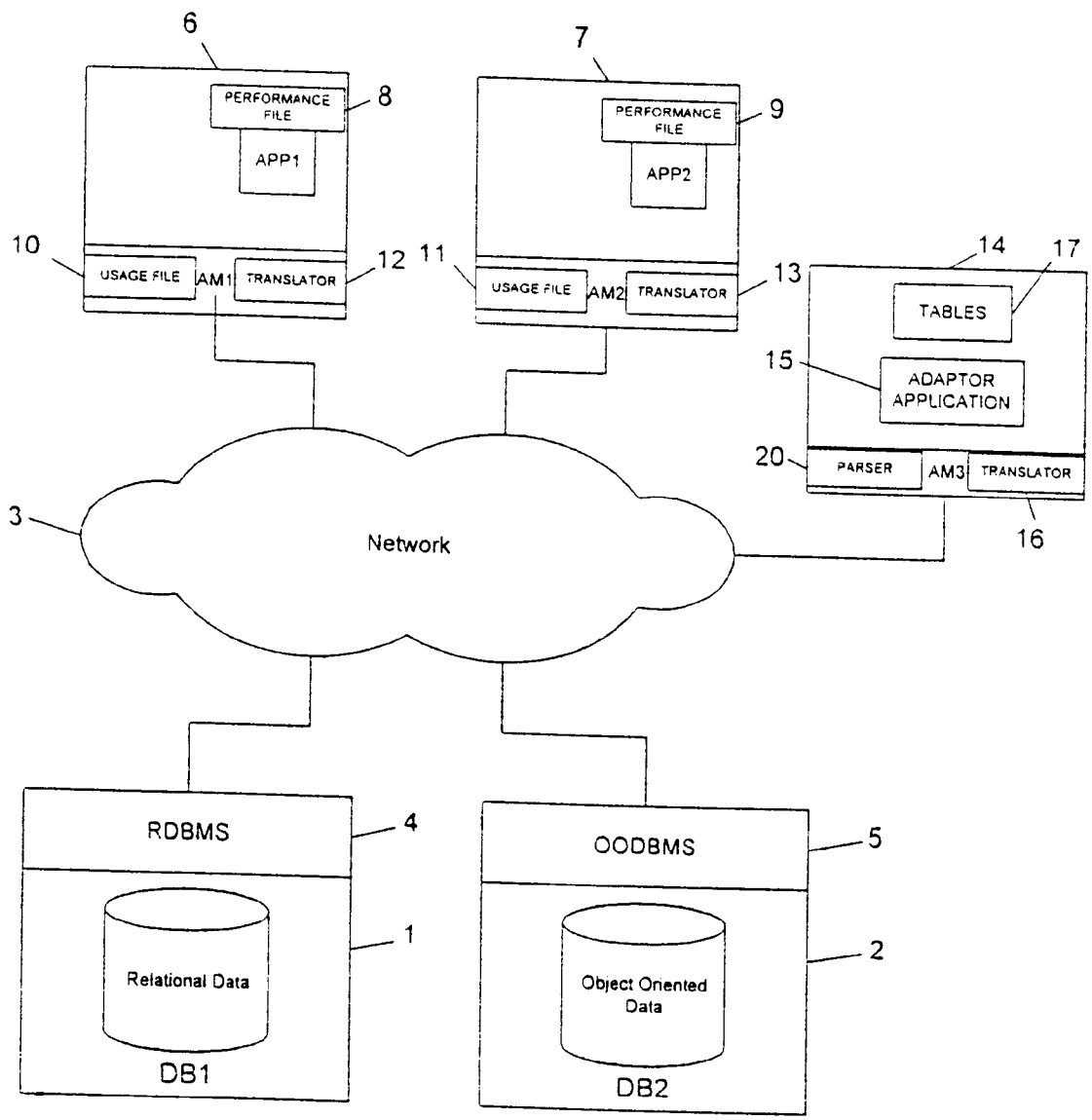
FIG. 1 is a schematic drawing of a network in accordance with one embodiment of the present invention.

FIG. 1 illustrates a first embodiment of the present invention wherein a first data base 1 (DB1) and a second data base 2 (DB2) are connected to a network 3 and thus form nodes in the network. The first data base 1 is a relational data base and includes a relational data base management system (RDBMS) 4. The second data base 2 is an object oriented data base and includes an object oriented data base management system (OODBMS) 5. The data base management systems 4 and 5 manage the respective data bases e.g. control access security back-ups etc. and operate to interface the data bases 1 and 2 to the network 3.

A first workstation 6 is connected to the network 3 and is operating a first application APP1 which is interfaced in the network 3 by an access manager AM1. A second workstation 7 is also connected to the network 3 and this is running a second application APP2 which is interfaced to the network 3 via an application manager AM2. The applications APP1 and APP2 include performance files 8 and 9 for storage of the monitored performance during retrieval and/or updating of data to the data bases 1 and 2. The access managers AM1 and AM2 include respective usage files 10 and 11 for storing information on the usage of the data bases 1 and 2. Also the access managers AM1 and AM2 include translators 12 and 13 for translating queries and data between data base formats where necessary.

The data base network also includes a controller 14 which operates an adapter application 15 for carrying out the adaption algorithm for the control of the distribution of data in the data bases 1 and 2 over the network 3. The adaptor application 15 is interfaced with the network 3 via an adaptor application access manager AM3. T he access manager AM3 includes a translator 16 for translating data between different data base formats where necessary and a parser 20 for parsing generic messages to move, copy, and/or delete data. The controller 14 also contains tables 17 which contain data identifying the location of data files in the data bases, information identifying the type or format of the data bases and their locations, and information identifying the data base containing information which may be accessed by each application APP1 and APP2.

Although in FIG. 1 only two workstations 6 and 7 are illustrated and only two data bases 1 and 2, any number can be provided over the network 3. Also, although the workstations 5 and 6 are illustrated as only operating single respective applications APP1 and APP2, they can, in a multi tasking environment, be operating more than one application which can retrieve and/or update data. The respective access manager in AM1 and AM2, identifies which of the applications in a respective workstation 6 and 7 has requested or sent data and it is routed accordingly.

Within FIG. 1 the adaptor application 15 and the table 17 are illustrated as being provided in a separate controller arrangement 14. However these can be distributed throughout the workstations 6 and 7 as is illustrated in FIGS. 2 and 3.

Figure 2:
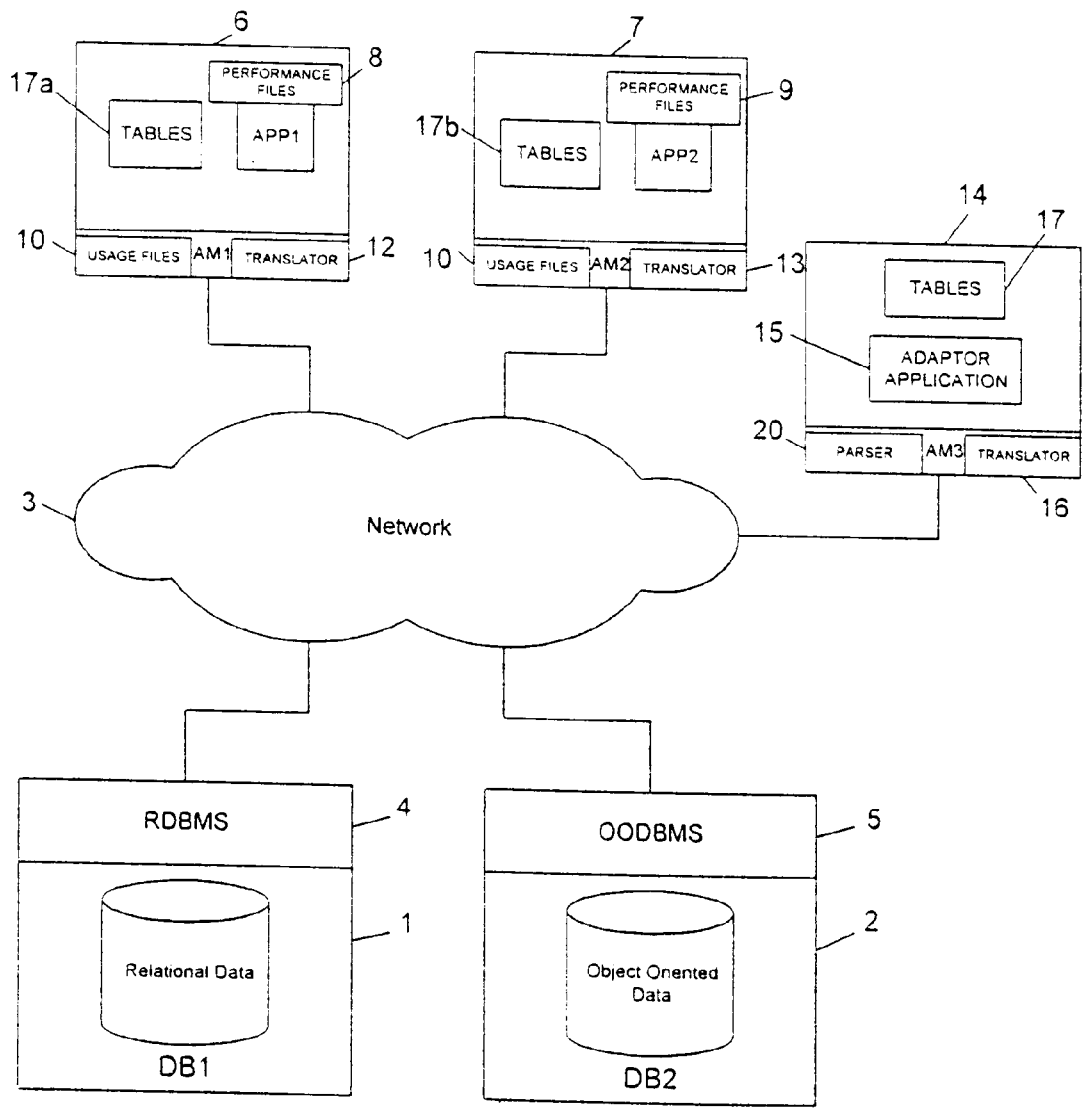
FIG. 2 is a schematic drawing of a network in accordance with the second embodiment of the present invention.

FIG. 2 illustrates an embodiment wherein the workstations 6 and 7 include tables 17a and 17b which are copies of table 17. This arrangement is advantageous since the access managers AM1 and AM2 can access the tables directly without incurring a network delay.

Figure 3:
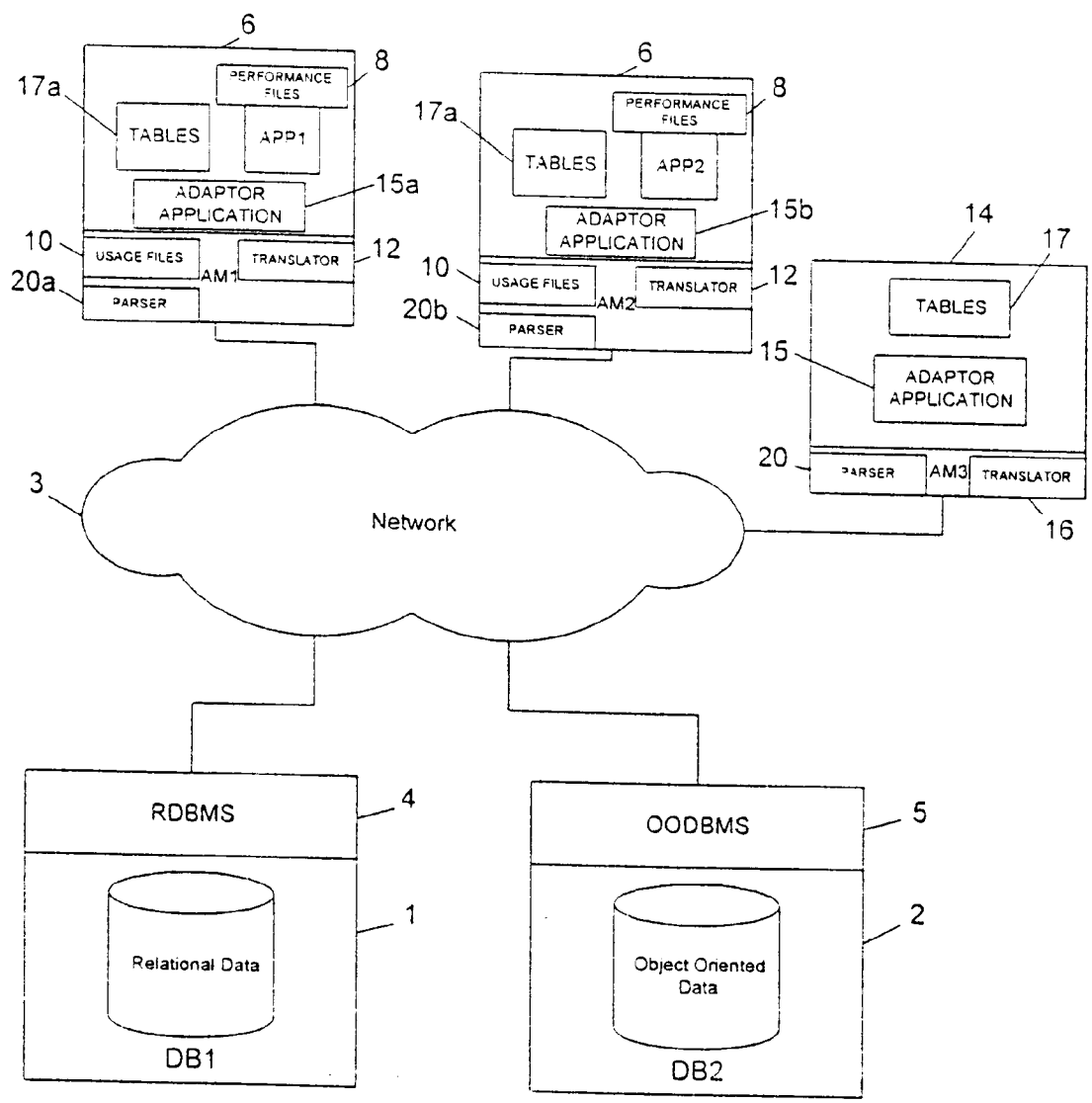
FIG. 3 is a schematic drawing in the network in accordance with the third embodiment of the present invention.

FIG. 3 illustrates a further embodiment where the workstations 6 and 7 also run local adaptor applications 15a and 15b and thus the adaption algorithm is carried out in a distributed manner. Local parsers 20a and 20b are provided in the respective access managers AM1 and AM2 for parsing generic messages from the respective adaptor applications 15a and 15b. This distribution of the adaptor application can either benefit simply from parallel processing, or the adaptor applications 15a and 15b could operate on a localised basis to control the distribution of data locally i.e. at only a few of the data bases.

Methods of adaptively controlling the configuration of the network will now be described.

Figure 4A:
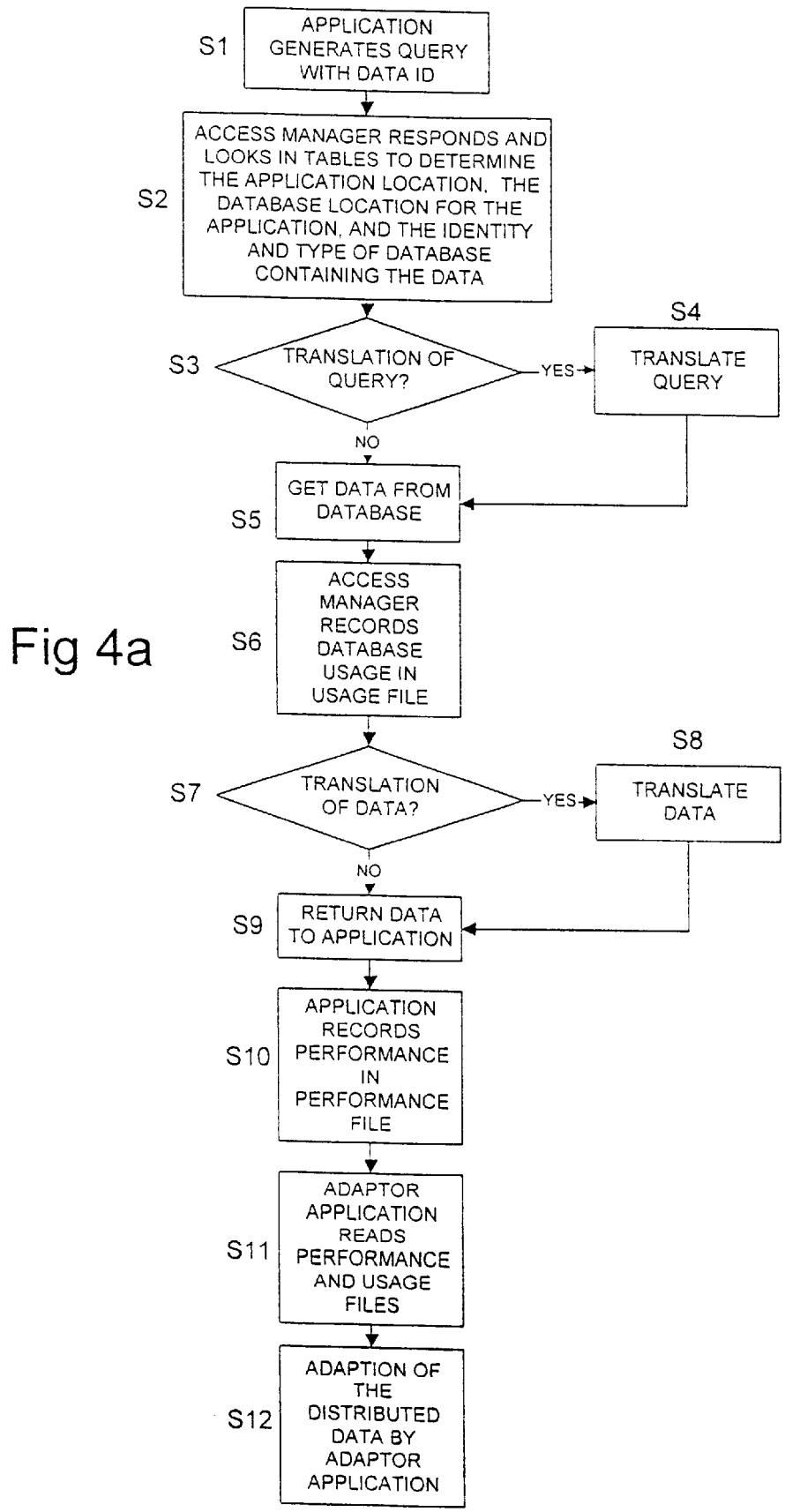
FIG. 4a is a flow diagram illustrating a retrieval operation.

FIG. 4a illustrates the steps carried out when data is requested from data base by an application on a workstation. In step S1 the application generates a query for data which includes the data identification (ID). In step S2 the access manager responds to the query and looks in the tables to determine the application location, the data base location for the applications and the identity and type of data base containing data. In step S3, based on the information from the tables, it is determined whether there is a difference in format between the format of the data base and the format of the application. In step S5 if there is a difference in format the query is translated, in step S5 the data is obtained from the data base. Step S6 the access manager records data base usage in the usage file. If the format of the data base is different to the format of the application, in step S7 it is determined whether the translation of the data is necessary and in step S8 the translation of the data takes place if necessary. In step S9 the data is returned to the application by the access manager. In step S10 the application records, in a performance file, how the long transaction took to complete which is an indication of the performance of the retrieval.

In step S11 the adaptor application reads the performance and usage files and in step S12 the adaptor application can determine whether adaption of the distributed data is necessary. This adaption can either take place off line, continuously in real time, only at predetermined times, or only when network traffic will permit the transference of data over the network between data bases.

The usage file used in step S6 contains an identification of the data record retrieved from the database, an identification of the database from which it was retrieved, an identification of the application which retrieved the data record, and the date and time of retrieval. The usage file can either comprise a single file for all databases, or it can comprise a single file for each database. This is used for determining an optimum configuration for the distributed database.

The performance files comprise a file for each application. The performance files contain data identifying the retrieved record data, the application identification, the query identification, and the transaction duration. These are used for determining whether to determine an optimum configuration for the distributed database.

In the embodiments described hereinabove, the tables 17, 17a and 17b can comprise a number of different tables containing information used for identifying the location of data in the distributed database. A system configuration table can contain data which identifies the database, the database type e.g. a relational database or an object oriented database, and the connect string used to connect to the database over the network. The advantage of using such a table is that when a new database is added to the distributed database network, its details can simply be added to this file and the algorithm, as will be described hereinafter, can adapt the network to efficiently accommodate it.

The tables can also include a data allocation table for each workstation which records where an application running on that workstation should look for each data record. In these embodiments of the present invention these tables specify where the information can be retrieved for an application.

The tables can also include a data configuration table which lists all of the locations of each type of data records.

The tables can further include an application configuration table which is used by the access manager so that it can determine where each application is running and so which data allocation table to use. The table thus contains the application identification and the identification of the workstation on which it is running.

Figure 4B:
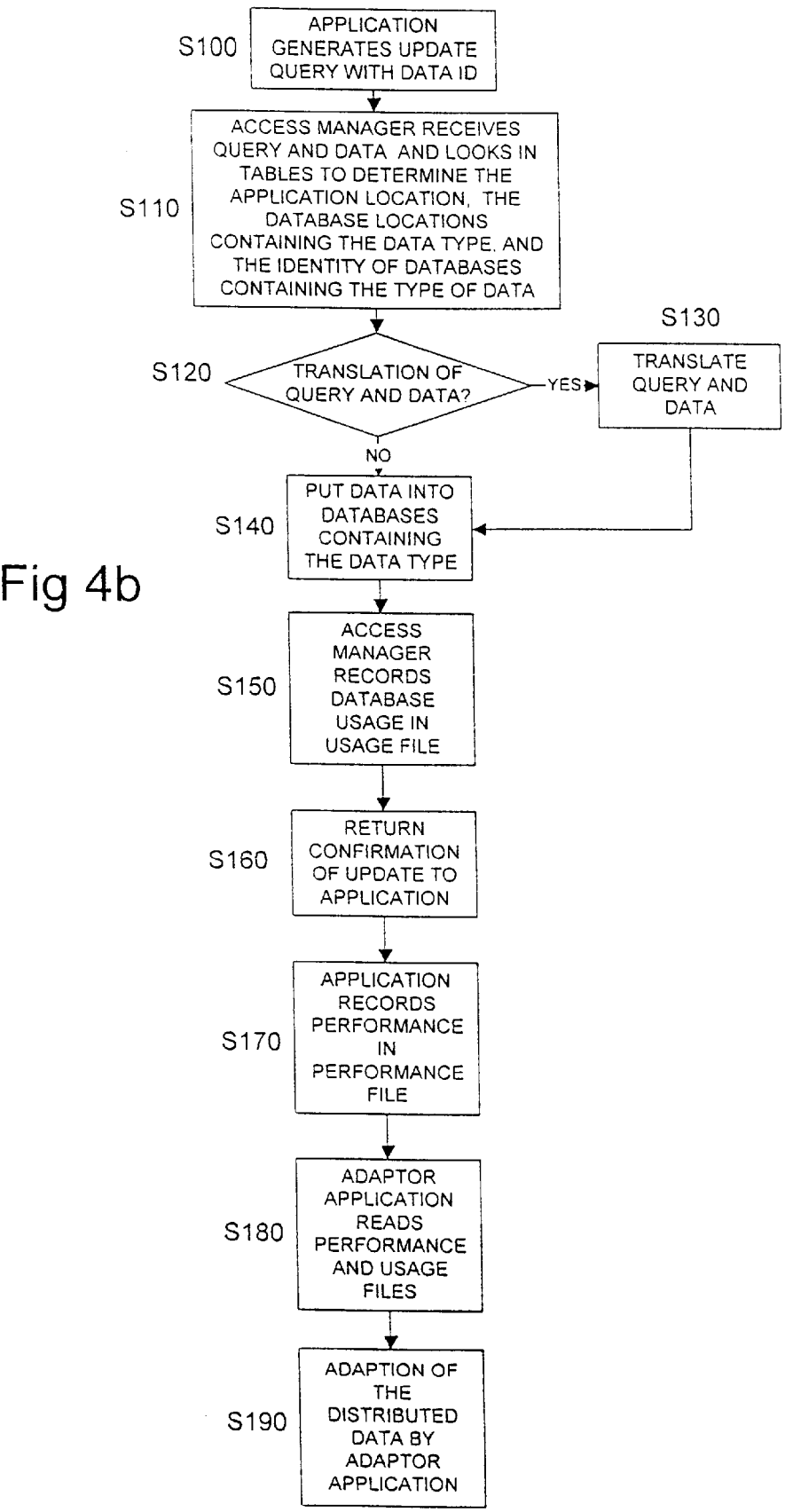
FIG. 4b is a flow diagram illustrating an update operation.

FIG. 4b is a flow diagram of steps carried out for an update. In step S100 the application generates an update query and identifies the data type which is to be updated. The access manager receives the query and data from the application in step S110 and looks in the tables to determine the application location, the database locations containing the data type and the identity of databases containing the type of data. In step S120 it is determined whether it is necessary to translate the update query and the data from one database format to another depending upon the database format of the data generated by the application and the data format of the target database to be updated. If a translation between database formats is required, in step S130 the update query and data are translated. In step S140 the data is then transferred to the databases containing the data type to update the data therein. In step S150 the access manager records the database usage in the usage file and in step S160 the database management system returns a confirmation of the updates to the application. The application then records the performance in the performance file in step S170 and in step S180 the adaptor application reads the performance and usage files. If the adaptor application determines that the performance of the database network can be improved, in step S190 the adaptor application adapts the distributed data.

Thus in accordance with the update method all of the database types which correspond to the type of the data generated by the application are updated for subsequent access by any other application over the distributed network.

The adaption algorithm in accordance with one embodiment of the present invention will now be described.

Applications access data on either a local server or, via a communications link, in a remote server. The best location of data depends on the concentrations of demand and the relative performance costs of each server and the associated communications costs. An optimum configuration may require data replications so that the overall demand for given data can be shared across multiple servers and so reduce load and performance costs for a given server. Whilst the distribution of data across multiple servers is desirable and advantageous for data retrieval, this poses difficulties for updating data since data must be updated at all servers. The algorithm aims to compute an improved cost solution to cause a re-configuration of the distributed database when overall performance figures have exceeded an undesirable threshold for example. Other factors can trigger the adaption such as the failure or anticipated shut down of one or more communication links or databases, or communication costs over a communication link exceeding a threshold.

The following algorithm in accordance with one embodiment of the present invention computes costs in terms of response times i.e. the time between initiating the request for data and the data being received.

The steps of the adapted method will now be described with reference to FIG. 5. In step S20 the adaption algorithm of the adaptor application is triggered into operation by a threshold decrease in performance being exceeded. In step S21 the adaptor application calculates the optimum distribution of data over the network and the optimum application to data links taking into consideration the modelling parameters as will be described hereinafter. In step S22 the adaptor application determines if there are differences in the optimum distribution of data and the current distribution of data and generates messages to copy, move and/or delete data at database nodes in the network and to update links identifying the nodes which are to receive queries from the applications i.e. where an application is to seek data. The adaptor application access manager receives the messages in step S23 and parses each messages. In step S24 the adapter application access manager uses the tables, in particular the configuration table to identify the database locations and types and sends instructions to the database drivers. In step S25 the database drivers copy, move and/or delete data in accordance with the instructions and the adapter application access manager translates data if the data is copied or moved from one database type to another. When all of the data has been moved, copied and/or deleted, in step S26 the adapter application access manager informs the adaptor application that all instructions have been carried out. In step S27 the adaptor application updates the tables and indicates any new locations of the data records in the network (i.e. update the data configuration file) and update the allocation file to specify where each application can find appropriate data in databases in the distributed network.

If data has to be moved from one database to another in order to increase performance, instead of moving the data, the data could be copied across one database to the other and subsequently deleted from the original database. This operation ensures that a copy of the database is always available for access. If the data is simply moved, the data may not be available during transit from one database to another. Further, if the movement of data is divided into a two stage copy and delete process, not all of the allocation tables need to be updated simultaneously. Before the deletion of the data, some applications can still access data from the old locations until their data allocation tables have been updated to indicate the new locations. Thus dividing the move operation into a copy and delete two stage operation may have advantages in a system which operates a real time adaptive algorithm.

Figure 5:
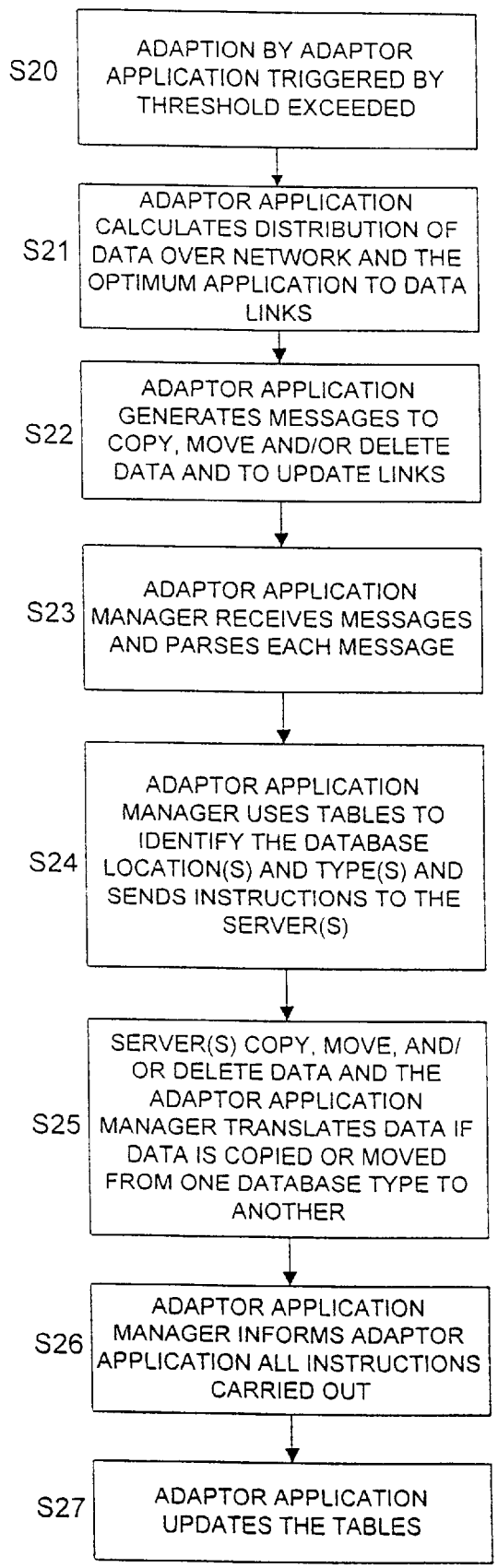
FIG. 5 is a flow diagram illustrating steps in adapting the network.

Although the adaption method of FIG. 5 has been described as including the moving of data, to optimise the database configuration it is not always necessary to move data between servers of the network. It may be possible to improve performance simply by changing the servers to which queries are sent by one or more applications. For example where data is present for an application on two servers, and the one currently receiving the queries for retrieving data is under a heavy load, the adaption method can simply cause the application query to be directed to the other server which is less heavily loaded.

Figure 6:
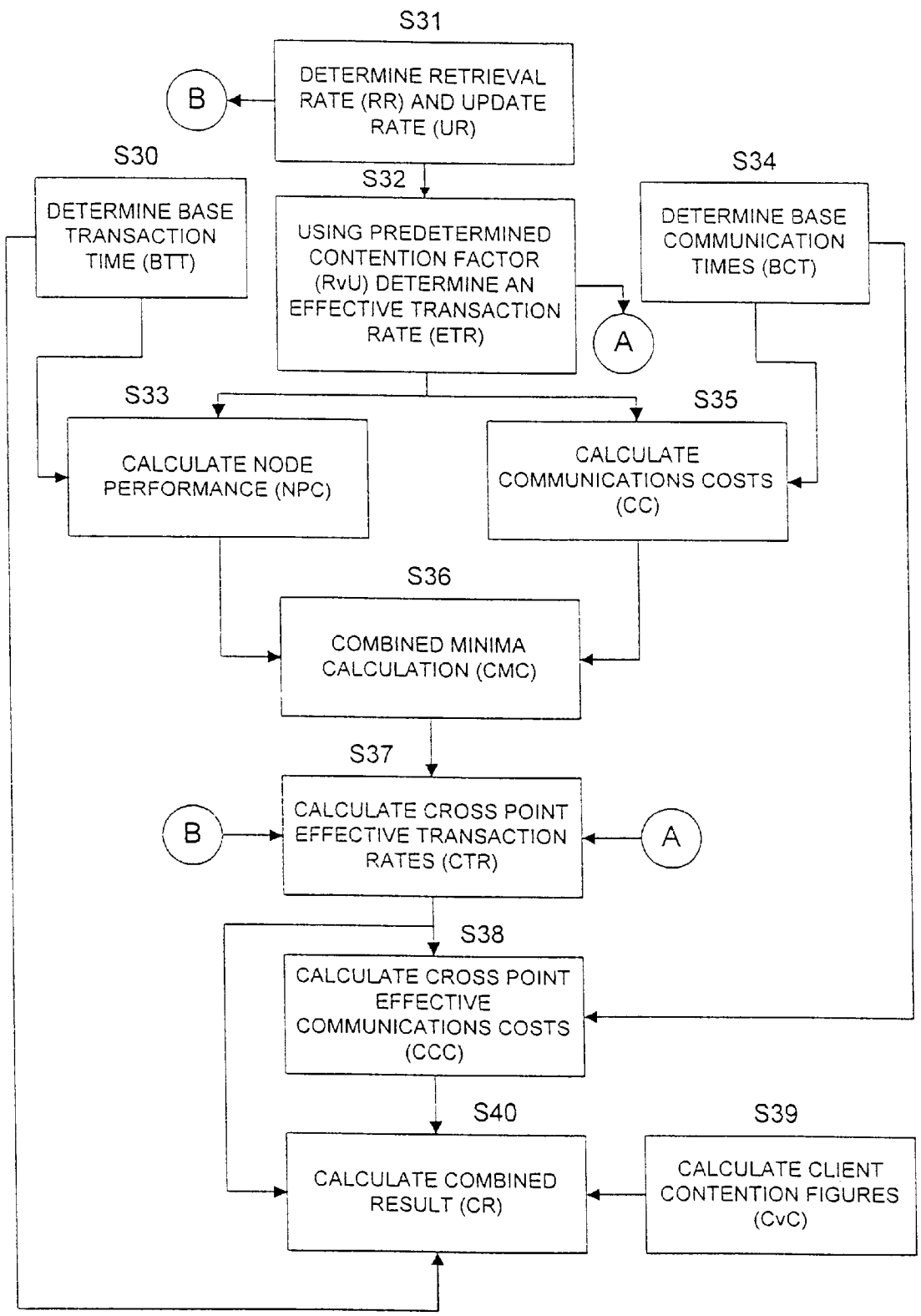
FIG. 6 is a flow diagram illustrating one particular method of calculating the distribution of data over the network.

A specific adaption algorithm for determining a data distribution and the network servers to which application queries are sent and which can be used to adapt the distributed database to improve access time (performance) will now be described in detail with reference to FIG. 6.

The method uses tables of figures which represent possible client server connections and related transaction rates and performance figures. These are modelling parameters which represent a model of the database. The performance figures represent costs that are likely to be incurred for a given configuration and are derived from measured values for similar transaction types to the ones being considered. The method broadly comprises the following stages.

Step through all the possible combinations of server node choice for data allocation, taking into account server and communications performance.

For each combination:

Calculate a least cost server for each client, based on individual retrieval/update rates and contentions between them. This gives client server connectivity and helps distribute server load.

Find update rates for the remaining clients for each server.

Calculate costs (considering any contention) for each server. This combines the 'retrieve' client retrieve/update rates and the update—only rates for the other clients.

Find the worst case value for the server combination and if this is better than the previous combination store the costs and connectivity.

Move or relocate data and connect clients to servers according to best cost and connectivity.

Considering first a retrieval only system. In the following tables the values used are only for explanatory purposes and do not represent proper calculated values.

For a system having six server nodes and six client nodes, where each client wishes to retrieve the same data fragment, the objective is to find the servers on which the data should reside so that the worst client/server transaction costs are minimised.

In Table 1 shown hereinbelow, the server nodes are represented by the table columns, and the clients by the tables rows. To simplify explanation, it is assumed that we have insignificant data contention and communications costs. The table cells represent the average performance costs as determined using the model parameters over a sample time period that a client might experience when performing a transaction with a relevant server. For example, if client N3 was to request server N2 for the specific data, the response time would be an average of 2309 milliseconds.

TABLE 1

Server Node Performance Costs (ms)

| client/server | N1 | N2 | N3 | N4 | N5 | N6 |
|---|---|---|---|---|---|---|
| N1 | 2360 | 2272 | 2215 | 2298 | 2250 | 2230 |
| N2 | 2382 | 2287 | 2230 | 2314 | 2262 | 2241 |
| N3 | 2339 | 2309 | 2200 | 2282 | 2238 | 2219 |
| N4 | 2320 | 2292 | 2247 | 2228 | 2168 | 2210 |
| N5 | 2320 | 2292 | 2247 | 2268 | 2228 | 2210 |
| N6 | 2330 | 2300 | 2253 | 2275 | 2233 | 2215 |

If the optimum configuration was chosen from the table, the rows with the minimum values would be the best choice, as represented by the figures typed in bold. In this case, the worst cost experienced by any client would be 2230 milliseconds (client N2 to server N3), and all clients would experience the best possible performance. Any other options would yield worst cost values. Hence data would be relocated on servers nodes N3, N5, N6 and the clients would be connected accordingly.

Viewing the problem instead from the point of view of contention between clients competing to access the same server node, and assuming a high degree of contention, the costs incurred would then become additive for a given column (server). A single approach to finding the least cost solution might be to choose the column where the additive cost would be minimum.

As can be seen from Table 2 the least-cost solution might appear to be to connect all clients to server node N6.

In reality, as with the actual algorithm, the additive effect would not be linear, and would be based upon the accumulative transaction rates and the impact of these on each of the servers and communication links, but the principle still applies.

TABLE 2

Sevrer Node Performance Costs

| client/server | N1 | N2 | N3 | N4 | N5 | N6 |
|---|---|---|---|---|---|---|
| N1 | 2360 | 2272 | 2215 | 2298 | 2250 | 2230 |
| N2 | 2332 | 2237 | 2230 | 2314 | 2262 | 2241 |
| N3 | 2339 | 2309 | 2200 | 2282 | 2238 | 2219 |
| N4 | 2320 | 2292 | 2247 | 2228 | 2168 | 2210 |
| N5 | 2320 | 2292 | 2247 | 2268 | 2228 | 2210 |
| N6 | 2330 | 2300 | 2253 | 2275 | 2233 | 2215 |

This solution is not however optimal. If some data replication and connection distribution was applied, the effects of contention on a given server would be reduced. Hence it would appear that greater replication means less contention, and hence less cost per server. However, if communication costs are introduced, there will be situations where a certain degree of the contention on a server is 'cheaper' than connecting to another server over a communication link. But, to rigorously compute the best configuration to achieve optimum results would require a large number of combinatorial calculations that could render the method impracticable for any realistically sized system.

The algorithm does in fact test for allocating the data to all possible server node combinations, but even then, there is only likely to be one 'least-cost' server for any given combination. Therefore, the key to this specific method is to try to find the best degree of replication and associated connectivity for which contention costs are minimised, taking into account the trade off between contention and communication costs.

The approach taken to deal with this can be explained by returning to the initial viewpoint of a 'contentionless' system. For a given server combination the 'minimum-row' value method can be used as a reasonable selector for connectivity i.e. distribution of load. Then, the contention that is due only to the actual clients accessing each server can be computed. This is repeated for all possible server combinations and the least overall worst case value and connectivity computed.

This may not produce the optimum configuration. For example, for a system where server costs vary but where there are insignificant communication costs, this method would find the optimal solution to connect all clients to the cheapest server, even though it is probable that relocation and distribution of connectivity would yield lower costs due to contention. However, this situation is somewhat artificial and where there are varied communication and server performance capabilities, reasonable balance configurations occur. This suggests that for a system where some performance thresholds are being exceeded, the method has a high probability of identifying a significantly better configuration.

For a system including both retrievals and updates, the situation is further complicated by the fact that all clients that are involved with updating the data record must update all servers on which the data resides, regardless of which server they are normally connected to for retrieval.

TABLE 3

Server Node Performance Costs (ms)

| client/server | N1 | N2 | N3 | N4 | N5 | N6 |
|---|---|---|---|---|---|---|
| N1 | | | 3215 | | 1250 | 1230 |
| N2 | | | 3230 | | 1262 | 1241 |
| N3 | | | 3200 | | 1238 | 1219 |
| N4 | | | 1247 | | 3168 | 1210 |
| N5 | | | 1247 | | 1228 | 3210 |
| N6 | | | 1253 | | 1233 | 3215 |

Referring to Table 3, as described earlier, the bold values represent the retrieval costs and the connectivity for each client server. If it is assumed that these values represent a combination of retrievals and updates the same costing principle would apply as before for finding load distribution, but for contention cost purposes we must also consider the update only costs for all the clients that would have to update the three servers. It is assumed that these costs are represented by the non bold figures in the clients column and the whole column for each server is computed. This is the principle used to take into account both retrieval and update contention.

The net effect of this is, that in this algorithm, the best configuration is a balance of costs derived from the retrieval rate, the update rate, contention, server performance and communication link performance. As each of these vary, so will the system configuration.

The algorithm derives costs from measured retrieval and update rates obtained from the usage files and the degree of contention between retrieval and update transactions, as well as contention between clients on the same server node. In the algorithm it is assumed that the server and communications performance can be based on an M/M/1 queue. This is based on random transaction arrival rates, exponential service times and the assumption of a single server per client. The principal equations used in the algorithm are:

$$\text{Response time} = 1/((1/BTT) - (1/TIT)) \quad (1)$$

where

BTT is the base transaction time; and

TIT is the transaction inter-arrival time.

$$\text{Overall transaction rate (OTR)} = ((\text{sum of retrieval and update transaction rates} - \text{maximum transaction rate}) \times \text{contention value}) + \text{maximum transaction rate} \quad (2)$$

Thus if the contention value=100%, then overall transaction rate=sum of transaction rates.

If the contention value=zero, the overall transaction rate= the maximum transaction rate.

For other contention values, the overall transaction rate will be between the two extremes.

A method of calculating the cost function in the adaptive algorithm for a distributed network having four client nodes and four server nodes will now be described hereinafter with reference to FIG. 6.

In step S30 a table of base transaction time (BTT) is created for the server nodes as shown in Table 4 below:

TABLE 4

Base Transaction Time (ms) - servers BTT

| N1 | N2 | N3 | N4 |
|---|---|---|---|
| 3000 | 2800 | 3100 | 2900 |

In step S31 tables of retrieval rate (RR) and update rates (UR) are then calculated for the client nodes as illustrated below in Table 5.

TABLE 5

| | 10 (transactions per second) | | | |
|---|---|---|---|---|
| | Retrieval Rate | Update Rate | Contention | |
| | RR | UR | RvU | ETR |
| N1 | 0.1 | 0.01 | 20% | .10 |
| N2 | 0.2 | 0.01 | 20% | .20 |
| N3 | 0.3 | 0.01 | 20% | .10 |
| N4 | 0.4 | 0.01 | 20% | .10 |

From system measurements, the Retrieval v Update (RvU) contention figures are estimated for each client node and using the retrieval Rates (RR), the Update Rates (UR), and the contention figures (RvU), the Effective Transaction Rate (ETR) for each client node is then calculated in step S32 using equation 2 given hereinabove. This technique determines the effective load on a given server.

In Step S33, the update and retrieval Node Performance Costs (NPC) are calculated and are illustrated in Table 6 below:

TABLE 6

U + R Node Performance Costs (NPC) - (in ms)

| client/server | N1 | N2 | N3 | N4 |
|---|---|---|---|---|
| N1 | 4323 | 3919 | 4533 | 4118 |
| N2 | 7614 | 6446 | 8293 | 7001 |
| N3 | 4323 | 3919 | 4533 | 4118 |
| N4 | 4323 | 3919 | 4533 | 4118 |

These are calculated using Equation 1 given hereinabove. The NPC values allow us to identify the likely cheapest client/server connections which will help to derive a suitable server load distribution to minimise contention on a given server.

In step S34 the Base Communication Time (BCT) are determined from system measurements and are illustrated in Table 7 below.

TABLE 7

| client/server | Base Comms Time (in ms) (BCT) | | | |
|---|---|---|---|---|
| | N1 | N2 | N3 | N4 |
| N1 | 400 | 1000 | 2000 | 1000 |
| N2 | 1000 | 400 | 2000 | 2000 |
| N3 | 1000 | 800 | 400 | 2000 |
| N4 | 800 | 1200 | 2000 | 400 |

These values are used to determine the likely communication costs for any given server/client communication load.

In step S35 the update and retrieval Communications Costs (CC) are determined using the Effective Transaction Rates (ETR) and the Base Communications Time (BCT) using Equation 1 and the values are illustrated in Table 8 below:

TABLE 8

U + R Communications Costs (in ms) (CC)

| client/server | N1 | N2 | N3 | N4 |
|---|---|---|---|---|
| N1 | 417 | 1114 | 2513 | 1114 |
| N2 | 1253 | 435 | 3356 | 3356 |
| N3 | 1114 | 871 | 417 | 2513 |
| N4 | 871 | 1367 | 2513 | 417 |

This provides the cost values incurred by the individual client server communication loads and is used to combine with the server loading costs to estimate overall costs.

The update and retrieval Node Performance Costs (NPC) are then added to the update and retrieval Communications Costs (CC) and the minima for each client (i.e. for each row) are determined in step S36 and are illustrated in Table 9 below:

TABLE 9

Combined Minima Calculation Table (in ms) (example for node sequence 1100)

| client/server | N1 | N2 | N3 | N4 | minima |
|---|---|---|---|---|---|
| N1 | 4740 | | | | 4740 |
| N2 | | 6881 | | | 6881 |
| N3 | | 4790 | | | 4790 |
| N4 | 5194 | | | | 5194 |

This enables a reasonable server load distribution to be found to reduce potential individual server contention costs. It also identifies the connection pattern for this selection (combination) of servers.

In step S37 Cross point effective Transaction Rates (CTR) are calculated by inserting Retrieval Rate (RR) for the client server nodes which correspond to the minima of the Combined Minima Calculation (CMC) table. For the remainder of the columns for servers N1 and N2 the update rates are inserted as illustrated in Table 10 below:

TABLE 10

Cross-point Effective Transaction Rates (CTR) Table

| client/server | N1 | N2 | N3 | N4 |
|---|---|---|---|---|
| N1 | 0.10 | 0.01 | | |
| N2 | 0.01 | 0.20 | | |
| N3 | 0.01 | 0.10 | | |
| N4 | 0.10 | 0.01 | | |
| cost | 4563 | 6996 | | |

(CTR rates in bold are ETR values, non-bold are UR values)

In step S38 the Cross-point effective Communication Costs (CCC) are calculated from the Cross-Point effective transaction Rates (CPR) and the Base Communication Times (BCT) and are illustrated in Table 11 below:

TABLE 11

Cross-point Effective Comms Costs (CCC) Table

| client/server | N1 | N2 | N3 | N4 |
|---|---|---|---|---|
| N1 | 417 | 1010 | | |
| N2 | 1010 | 435 | | |
| N3 | 1010 | 871 | | |
| N4 | 871 | 1215 | | |
| CCmax | 1010 | 1215 | | |

The server load communication costs for the combined client demands are calculated. The individual demands for the 'retrieval connected' clients will be the ETR values, and those for update only will be the UR values. These are represented in the server columns of the CTR table. The overall worst case cost for a given server (disregarding communications costs) will be that caused by the combined demand on that server (the cost value in the CTR table) This requires an estimate of contention to determine the degree of combination of the individual client demands (CvC) in the calculations below. For communications, the individual costs can be calculated (as they do not compete) and the worst case figure found (CCmax in the CCC Table) Combining cost and CCmax gives the worst case overall cost experienced by any client attached to that server.

The client contention figures are calculated in step S39 and in step S40 the Combined Result (CR) is calculated and illustrated in Table 12 below.

TABLE 12

Combined Results (CR) Table (in ms)

| N1 | N2 | N3 | N4 | CRmax |
|---|---|---|---|---|
| 5574 | 8210 | | | 8210 |

From the results the lowest cost option server combination and client connection pattern is then chosen. The configuration of the distributed database can then be updated accordingly by moving data and/or updating server locations for applications and reconnecting clients appropriately.

In the adaptive algorithm described hereinabove assumptions are made in order to reduce the calculations necessary in order to minimise the cost function. The inventors have investigated the possibility of using a genetic algorithm to determine the distributed database configuration and two alternative such methods are described hereinafter.

Figure 7:
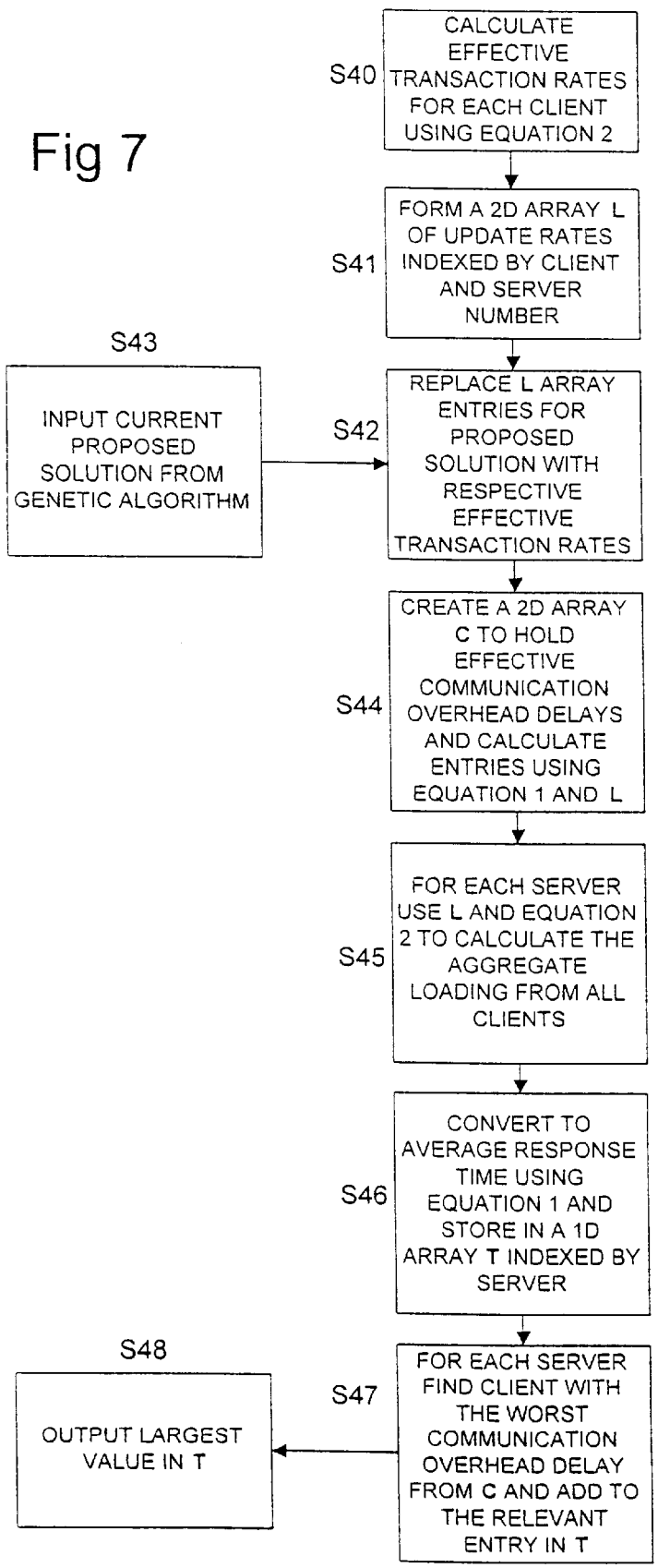
FIG. 7 is a flow diagram of the steps for determining the evaluation function in another method.

FIG. 7 is a flow diagram of the steps which are common to both methods. This method evaluates the performance of the distributed database in order to determine the worse transaction times between the clients and the servers.

Tables 13, 14 and 15 below illustrate the modelling parameters used in these two genetic algorithm methods. The algorithm operates for a distributed database system comprising ten clients and ten servers and a server contention overlap of 10% is assumed.

TABLE 13

Server Base Transaction Times (BTT) per node (in milliseconds)

| SERVER | BTT |
|---|---|
| 1 | >3000 |
| 2 | >2800 |

TABLE 13-continued

Server Base Transaction Times (BTT) per node (in milliseconds)

| SERVER | BTT |
| --- | --- |
| 3 | >3100 |
| 4 | >2900 |
| 5 | >4000 |
| 6 | >5000 |
| 7 | >3500 |
| 8 | >4000 |
| 9 | >4500 |
| 10 | >3750 |

TABLE 14

Client Application rates per node: Retrieval Rate (RR), Update Rate (UR), Overlap % (in events per second)

| CLIENT | RR | UR | OVERLAP |
| --- | --- | --- | --- |
| 1 | >0.1 | 0.01 | 20 |
| 2 | >0.2 | 0.01 | 20 |
| 3 | >0.1 | 0.01 | 20 |
| 4 | >0.1 | 0.01 | 20 |
| 5 | >0.15 | 0.01 | 20 |
| 6 | >0.1 | 0.01 | 20 |
| 7 | >0.1 | 0.01 | 20 |
| 8 | >0.15 | 0.02 | 25 |
| 9 | >0.1 | 0.01 | 15 |
| 10 | >0.1 | 0.02 | 15 |

TABLE 15

Base Comms Table (time is milliseconds):

| Server/Client | 1 | 2 | 3 | 4 | 5 | 6 | 7 | 8 | 9 | 10 |
| --- | --- | --- | --- | --- | --- | --- | --- | --- | --- | --- |
| 1 | 400 | 1000 | 2000 | 1000 | 1500 | 1200 | 1600 | 1700 | 1650 | 1800 |
| 2 | 1000 | 400 | 2000 | 2000 | 1800 | 1900 | 1750 | 1650 | 1800 | 1900 |
| 3 | 1000 | 800 | 400 | 2000 | 1750 | 1600 | 1670 | 1760 | 2000 | 1900 |
| 4 | 800 | 1200 | 2000 | 400 | 1850 | 1900 | 1950 | 1850 | 1900 | 2000 |
| 5 | 900 | 1100 | 1900 | 1700 | 400 | 1800 | 1600 | 1760 | 1640 | 1860 |
| 6 | 950 | 1050 | 1950 | 1800 | 1600 | 400 | 1550 | 1750 | 1750 | 1800 |
| 7 | 1000 | 1100 | 1900 | 1500 | 1650 | 1800 | 400 | 1700 | 1700 | 1800 |
| 8 | 900 | 950 | 1800 | 1900 | 1800 | 1500 | 1700 | 400 | 1900 | 1950 |
| 9 | 850 | 1050 | 1850 | 1950 | 1750 | 1700 | 1650 | 1700 | 400 | 1900 |
| 10 | 850 | 1000 | 1800 | 1900 | 1800 | 1750 | 1700 | 1650 | 1870 | 400 |

Referring now to FIG. 7, in step 540 the Effective Transaction Rate (ETR) is calculated for each client by combining the Retrieval and Update Rates, using the percentage Overlap and equation 2 given hereinabove. In step S41 a two-dimensional array L is populated with the Update Rate calculated for that client and indexed by client and server number. Where a server is to be used by a particular client as indicated in the input current proposed solution from the generic algorithm (S43), in step S42 the corresponding array entry in L is replaced with that clients Effective Transaction Rate. A two-dimensional array C is them created in step S44 to hold Effective Communication Overhead Delays. For each client/server interaction rate, now defined in L, the corresponding entry in C is calculated using equation 1 given hereinabove. In step S45, for each server, the client entries in L are used to calculate aggregate loading from all clients on that server using equation 2 given hereinabove. In Step S46 this is then converted to an average response time using equation 1 given hereinabove and this is stored in a one-dimensional array T indexed by server. Any calculated infinite response times are replaced with a suitably large response time. In step S47, for each server, the client with the worst Communications Overhead Delay is found from C and this added to the relevant entry in T. In step S48 the largest value in T is then output and this represents the worst performance for this database configuration.

Figure 8:
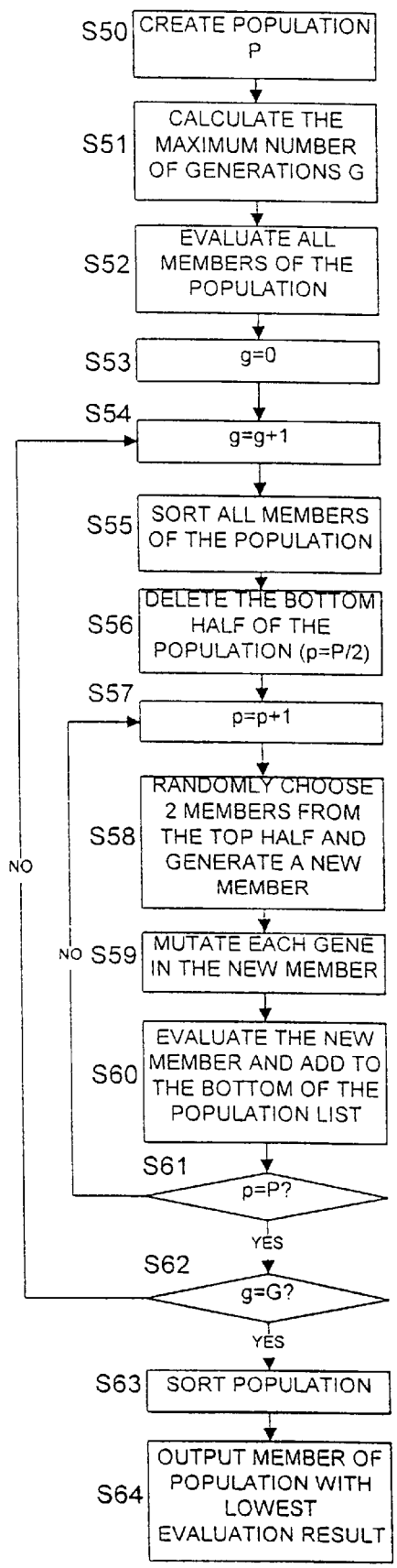
FIG. 8 is a flow diagram of a breeder genetic algorithm for determining the lowest evaluation result.

The first algorithm for generating proposed solutions will be described hereinafter with reference to FIG. 8. This flow diagram illustrates the steps of a breeder genetic algorithm. In step S50 an initial random population P is created using a non-binary representation. Each gene position corresponds to a client node and the allele indicates which server that client is to use for retrieval access. The maximum number of Generations G to be allowed is calculated in step S51 from the following equation:

$$G = 5000/((\text{population size}/2)+1)$$

In step S52 all members of the population are then evaluated using the method of FIG. 7. In step S53 the current generation number g is set to zero and in step S54 the current generation number g is incremented by 1 and a loop in the algorithm is entered. All of the members of the population are sorted in step S55 based on the evaluation result such that the lowest result is sorted to the top i.e. is the best. The bottom half of the population is then deleted in step S56 and thus the current population p is set to equal half of the total population P. In step S57 the current population p is incremented by 1 and in step S58 two members from the top half of the population are chosen at random and a new member is generated using uniform cross over. In step S59 using uniformly distributed allele replacement each gene is mutated in this new member based on the defined percentage chance of mutation. In step S60 the new member is evaluated using the procedure of FIG. 7 and this is added to the bottom of the population list. In step S61 it is then determined whether the original population size has been restored i.e. p=P and if not the process returns to step S57. If the original population size P has been restored the process proceeds to step S62 whereupon it is determined whether the maximum number of generations G has been reached i.e. g=G. If g does not=G the process returns to step S54. If g=G the process proceeds to step S63 where all members of the population are sorted based on the evaluation results with the lowest result as best. In step S64 the member of the population with the lowest evaluation result is output. This can then be used for determining the configuration of the distributed database.

Figure 9:
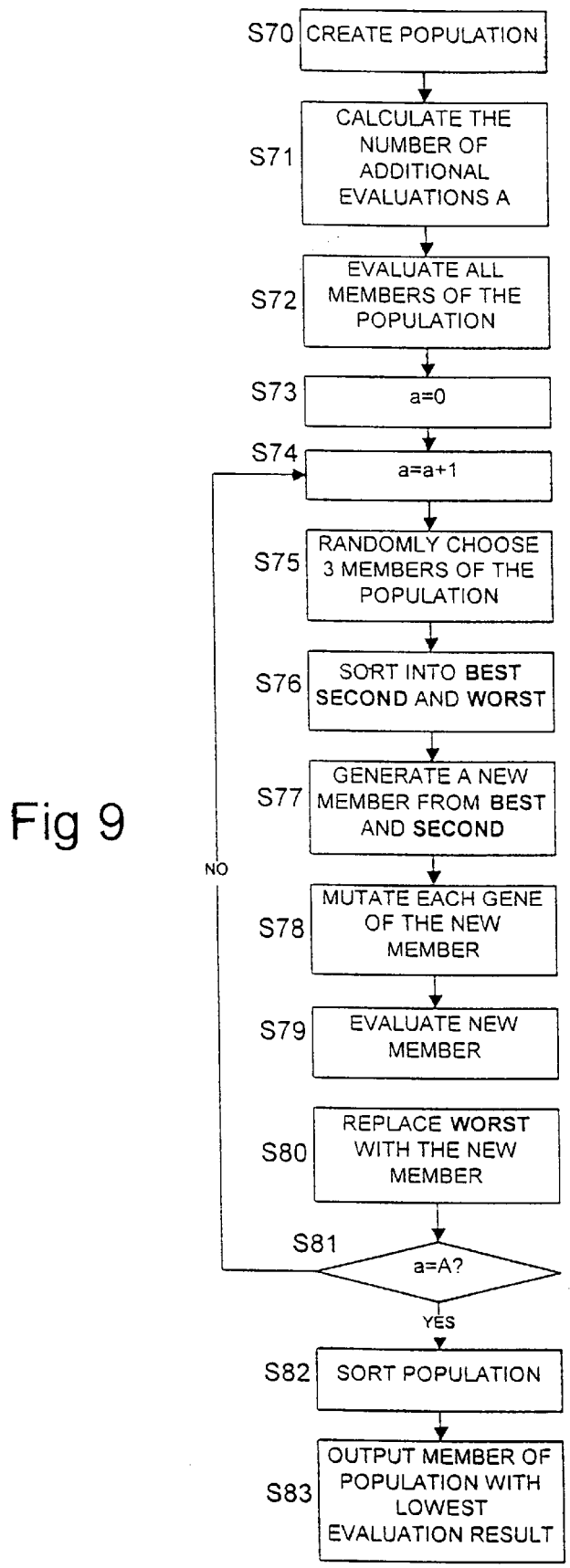
FIG. 9 is a flow diagram of a tournament genetic algorithm for determining the lowest evaluation result.

FIG. 9 illustrates an alternative method which implements a tournament generic algorithm. In step S20 an initial random population is created using a non-binary representation. Each gene position corresponds to a client node and the allele indicates which server that client is to use for retrieval access. In step S71 the maximum number of additional evaluations A to be allowed is calculated using the following equation:

$$A=5000-\text{population size}$$

In step S72 all members of the population are evaluated using the method of FIG. 7. In step S73 the current evaluation a is set to zero and in step S74 the current evaluation a is incremented to enter a loop in the algorithm.

Three members of the population are then chosen at random in step S75 and in step S76 these are sorted into BEST, SECOND, and WORST. A new member is created in step S77 using uniform cross over from the BEST and SECOND. Each gene in this new member is mutated in step S78 based on the defined percentage chance of mutation using the uniformly distributed allele replacement. The new member is then evaluated in step S79 and in step S80 a new member is used to replace the WORST. In step S81 it is then determined whether the number of additional evaluations has been reached i.e. a=A and if not the process returns to step S74. If the number of additional evaluations has been reached, the process proceeds to step S82 where all the members of the population are sorted based on the evaluation result with the lowest result as BEST. In step S83 the member of the population with the lowest evaluation result is then output. Details on this output member of the population can then be used for the configuration of the distributed database in order to improve the system performance.

Although in both genetic algorithms described above 5000 evaluations are used any suitable number can be used. The mutation rate and population size can be appropriately selected to tune the genetic algorithm. For example a mutation rate of 14% can be chosen and a population size of anything from 5 to 100 depending on the scenario. Also, although the cross over technique is given in the above embodiments as the uniform cross over technique, other techniques such as skewed cross over (gene splicing) may be used.

Although two specific methods of adaption has been described hereinabove, the present invention is not limited to such methods. Any method of adaption which minimises a cost function is included within the scope of the present invention. One further method could be implemented by a neural network for example. Further, although in the specific embodiment the transaction time (performance) is the cost function which is minimised, any combination of performance related parameters can be used.

Although specific embodiments of the present invention have been described hereinabove with reference to the drawings, it will be apparent to a skilled person in the art that modifications are possible within the spirit and scope of the present invention.

What is claimed is:

1. Apparatus for identifying optimum configuration parameters of a model of a distributed information network, said network comprising a plurality of interconnected information centers, each information center holding any number of information units, a plurality of information application means connected over the network to the information centers, each of said information application means being arranged to change the distribution of information units by retrieving information units from and/or updating information units at one or more specified information centers, and wherein the distribution of the information units across the information centers is controlled in accordance with a predetermined set of configuration parameters, said apparatus comprising:
   (i) a plurality of sets of one or more predetermined configuration parameters;
   (ii) modelling means for modelling the distributed information network;
   (iii) means operable to run the modelling means in accordance with each set of predetermined configuration parameters;
   (iv) evaluating means for evaluating the performance of the modelling means when run in accordance with each set of predetermined configuration parameters; and
   (v) selecting means for selecting one of the sets of predetermined configuration parameters for which performance of the modelling means is closest to a predetermined performance measure,
   which selected set is for controlling the distribution of the information units in the network.

2. Apparatus as in claim 1 further comprising distribution control means operable to change the distribution of information units across the plurality of information centers in accordance with the selected set of configuration parameters.

3. Apparatus as in claim 2 further comprising:
   monitoring means for monitoring distribution of information units over the network, and
   wherein the distribution control means is further arranged to receive an input representative of the performance of the network from the monitoring means, and compare the input performance with a predetermined threshold, such that if the input performance falls below the predetermined threshold, the distribution control means effects the said change in distribution of information units.

4. Apparatus as in claim 2 wherein said distribution control means is operable to copy, move and/or delete information units at information centers to change the distribution of the information units across the information centers.

5. Apparatus as in claim 2 wherein said distribution control means is operable to change the distribution of the information units and/or update the specified information centers continuously.

6. Apparatus as in claim 2 wherein said distribution control means is operable to change the distribution of the information units and/or update the specified information centers when network traffic volume is low.

7. Apparatus as in claim 2 wherein said distribution controls means is adapted to change the distribution of the information units and/or update the specified information centers at predetermined times.

8. Apparatus as in claim 1 wherein a measure of performance of the modelling means includes the time taken for one or more information application means to retrieve and/or update information units at one or more information centers.

9. Apparatus as in claim 2 wherein the modelling means is operable to receive one or more configuration constraints, which constraints include a constraint of updating the specified information centers in preference to changing the distribution of information units in order to improve the performance of the modelling means.

10. Apparatus as in claim 3 wherein said monitoring means is operable to monitor the usage of information units by said information application means.

11. Apparatus as in claim 2 wherein said distribution control means is operable in response to a trigger criterion.

12. Apparatus as in claim 10 wherein said distribution control means is operable to change the distribution in response to at least one of failure of an information center, a network link failure or change, and when the time taken by one or more information application means to retrieve and/or update information units at one or more information centers exceeds a threshold.

13. Apparatus as in claim 10 wherein said monitoring means includes performance monitoring means for monitoring the retrieval and/or update performance by at least one information application means, and trigger means for causing said distribution control means to operate by determining when the monitored performance falls below a threshold.

14. Apparatus as in claim 10 further including trigger means, and wherein said monitoring means includes communication monitoring means for monitoring communication over the network links, the trigger means being responsive to said communication monitoring means, and thereby causing said distribution control means to operate.

15. Apparatus as in claim 3 further including performance estimating means for estimating the performance of the network if it were to be configured using the selected sets of configuration parameters; and trigger means for causing said distribution control means to change the distribution of information units in response to the monitored network performance and the estimated network performance.

16. Apparatus as in claim 2 wherein said distribution control means includes table means specifying the information centers containing specific information and specifying which of the information centers from and/or to which information units can be retrieved and/or updated respectively by which of the information application means.

17. Apparatus as in claim 16 wherein said table means identifies at which information centers specific information units are held, and which information applications means have access to which information units.

18. Apparatus as in claim 17 further including means for searching for, in said table means, the information center for the retrieval or updating of information units by an information application means.

19. Apparatus as in claim 1 the apparatus being arranged to control a distributed database network wherein said information units comprise tables, classes, information records or objects.

20. Apparatus as in claim 17, the apparatus being arranged to control a switch network, wherein the information units of said information centers comprise call routing information.

21. A method of identifying optimum configuration parameters of a model of a distributed information network, said network comprising a plurality of interconnected information centers, each information center holding any number of information units, a plurality of information application means connected over the network to the information centers, each of said information application means being arranged to change the distribution of information units by retrieving information units from and/or updating information units at one or more specified information centers, and wherein the distribution of the information units across the information centers is controlled in accordance with a predetermined set of configuration parameters, said method comprising the steps of:

modelling the distributed information network using modelling means;

running the modelling means in accordance with each of a plurality of sets of predetermined configuration parameters;

evaluating the performance of the modelling means when run in accordance with each set of predetermined configuration parameters; and selecting one of the sets of predetermined configuration parameters for which performance of the modelling means is closest to a predetermined performance measure;

which selected set is for controlling the distribution of the information units in the network.

22. A method as in claim 21 further including the step of changing the distribution of the information units across the information centers in accordance with the selected set of configuration parameters.

23. A method as in claim 22 further including the steps of
monitoring the distribution of information units over the network in order to measure the performance of the network,
comparing the measured network performance with a predetermined threshold, and
if the measured network performance falls below the predetermined threshold, effecting the said change to the distribution of information units.

24. A method as in claim 22 including the step of copying, moving and/or deleting information units at information centers to change the distribution of the information units across the information centers.

25. A method as in claim 22 in which the distribution of information units is changed continuously and/or the specified information centers are updated continuously.

26. A method as in claim 22 in which the distribution of the information units is changed and/or the specified information centers are updated when the network traffic is low.

27. A method as in claim 22 in which the distribution of the information units is changed and/or the specified information centers are updated at predetermined times.

28. A method as in claim 27 wherein a measure of the performance of the modelling means includes the time taken for one or more information application means to retrieve and/or update information units at one or more information centers.

29. A method as in claim 21 in which the step of modelling the network includes incorporating configuration constraints, which constraints include updating specified information centers for the information application means in preference to changing the distribution of information units in order to improve the performance of the modelling means.

30. A method as in claim 23 in which the monitoring step comprises monitoring the usage of information units by the information application means.

31. A method as in claim 27 wherein the step of changing the distribution of information units occurs in response to a trigger criterion.

32. A method as in claim 30 in which the step of changing the distribution of information units occurs in response to at least one of failure of an information center, a network link failure or change, and when the time taken by one or more information application means to retrieve and/or update information units at one or more information centers exceeds a threshold.

33. A method as in claim 30 in which the monitoring step includes monitoring the retrieval and/or updating performance by at least one information application means, and the step of changing the distribution of information units occurs in response to the monitored performance falling below a threshold.

34. A method as in claim 30 wherein the monitoring step includes monitoring communications over the network links, and step of changing the distribution of information units is responsive to the monitored communications.

35. A method as in claim 23 including the steps of estimating the performance of the network if it were to be configured using the selected set of configuration parameters, and changing the distribution of information units and/or updating the specified information centers in dependence upon a predetermined relationship between the monitored network performance and the estimated network performance.

36. A method as in claim 21 including the step of storing a table specifying the information centers containing specific information and specifying which of the information centers from and/or to which information units can be retrieved and/or updated respectively by which of the information application means.

37. A method as in claim 35 in which the table identifies at which information centers specific information units are held, and which information application means have access to which information units.

38. A method as in claim 36 including the step of using the table to look-up the information center for the retrieval or updating of information units by an information application means.

39. A method as in claim 21 wherein the network comprises a network of distributed database and wherein the information units comprise tables, classes, information records, or objects.

40. A method as in claim 21 wherein the network comprises a switch network wherein the information units of the information units of the information centers comprise call routing information.

41. A computer program, or a suite of computer programs, comprising a set of instructions to cause a computer, or a suite of computers, to perform the method according to claim 21.

* * * * *